(12) United States Patent
Han et al.

(10) Patent No.: US 12,146,751 B2
(45) Date of Patent: Nov. 19, 2024

(54) VEHICLE LANE CHANGING TRAJECTORY PLANNING METHOD, APPARATUS AND DEVICE, STORAGE MEDIUM AND VEHICLE

(71) Applicant: Shaanxi University of Technology, Hanzhong (CN)

(72) Inventors: Jin Han, Hanzhong (CN); Yangfan Chen, Hanzhong (CN); Likun Cui, Hanzhong (CN); Renhe Zhai, Hanzhong (CN)

(73) Assignee: SHAANXI UNIVERSITY OF TECHNOLOGY, Shaanxi (CN)

( * ) Notice: Subject to any disclaimer, the term of this patent is extended or adjusted under 35 U.S.C. 154(b) by 197 days.

(21) Appl. No.: 17/739,068

(22) Filed: May 6, 2022

(65) Prior Publication Data

US 2022/0333938 A1    Oct. 20, 2022

Related U.S. Application Data

(63) Continuation of application No. PCT/CN2021/122804, filed on Oct. 9, 2021.

(30) Foreign Application Priority Data

Apr. 19, 2021   (CN) .......................... 202110416172.7

(51) Int. Cl.
*G06F 17/00*        (2019.01)
*B60W 40/105*     (2012.01)
(Continued)

(52) U.S. Cl.
CPC ....... *G01C 21/3446* (2013.01); *B60W 40/105* (2013.01); *B60W 50/085* (2013.01); *B60W 2552/53* (2020.02); *B60W 2554/4045* (2020.02)

(58) Field of Classification Search
CPC ............ G01C 21/3446; B60W 40/105; B60W 50/085; B60W 2552/53; B60W 2554/4045
(Continued)

(56) References Cited

U.S. PATENT DOCUMENTS 10,338,586 B2 *   7/2019   Kurt ..................... G05D 1/0282
11,287,818 B2 *   3/2022   Panzica ................ G05D 1/0212
(Continued)

FOREIGN PATENT DOCUMENTS

CN    110044359 A    7/2019
CN    111750887 A    10/2020
(Continued)

OTHER PUBLICATIONS

Li, Real-Time Trajectory Planning for Autonomous Urban Driving: Framework, Algorithms, and Verifications IEEE/ASME Transactions on Mechatronics, vol. 21, No. 2, Apr. 2016 (Year: 2016).*
(Continued)

*Primary Examiner* — Matthew Ell
*Assistant Examiner* — Matthew J Ludwig
(74) *Attorney, Agent, or Firm* — Tutunjian & Bitetto, P.C.

(57) ABSTRACT

The vehicle lane changing trajectory planning method includes: determining a starting point and an end point of a to-be-planned path on a grid lane changing map, which is a gridded local map reflecting a lane changing condition and takes a road boundary as a map boundary; performing weight allocation on all grids in the grid lane changing map by using a potential function; searching for optimal solutions corresponding to different weight requirements between the starting point and the end point; smoothing the optimal solutions corresponding to the different weight requirements to obtain lane changing trajectories corresponding to the different weight requirements; and selecting an optimal lane (Continued)

changing trajectory from the lane changing trajectories corresponding to the different weight requirements.

8 Claims, 3 Drawing Sheets

(51) Int. Cl.
*B60W 50/08* (2020.01)
*G01C 21/34* (2006.01)

(58) Field of Classification Search
USPC .......................................... 701/533
See application file for complete search history.

(56) References Cited

U.S. PATENT DOCUMENTS

| | | | | |
|---|---|---|---|---|
| 11,435,199 | B2* | 9/2022 | Lermusiaux | G01C 21/3469 |
| 11,644,834 | B2* | 5/2023 | Ditty | G06F 15/7807 |
| | | | | 701/23 |
| 2013/0345895 | A1* | 12/2013 | Reynolds | G07C 5/0816 |
| | | | | 701/1 |
| 2017/0060133 | A1* | 3/2017 | Seo | G05D 1/0088 |
| 2019/0113927 | A1* | 4/2019 | Englard | G06N 5/046 |
| 2019/0130199 | A1* | 5/2019 | Pohl | G06N 5/04 |
| 2020/0139959 | A1* | 5/2020 | Akella | B60W 60/0015 |
| 2020/0398894 | A1* | 12/2020 | Hudecek | G05D 1/0214 |
| 2022/0198198 | A1* | 6/2022 | Marcotte | G01C 21/3822 |
| 2022/0297718 | A1* | 9/2022 | Yu | B60W 60/001 |

FOREIGN PATENT DOCUMENTS

| | | |
|---|---|---|
| CN | 111857160 A | 10/2020 |
| CN | 113085895 A | 7/2021 |
| KR | 20210018678 A | 2/2021 |

OTHER PUBLICATIONS

Glaser, Maneuver-Based Trajectory Planning for Highly Autonomous Vehicles on Real Road With Traffic and Driver Interaction, IEEE, Sep. 2010 (Year: 2010).*

Lim, Hybrid Trajectory Planning for Autonomous Driving in On-Road Dynamic Scenarios, IEEE Transactions on Intelligent Transportation Systems, Jan. 2021 (Year: 2021).*

Erke, An improved A-Star based path planning algorithm for autonomous land vehicles, International Jounal of Advanced Robotic Systems, 2020 (Year: 2020).*

* cited by examiner

VEHICLE LANE CHANGING TRAJECTORY PLANNING METHOD, APPARATUS AND DEVICE, STORAGE MEDIUM AND VEHICLE

CROSS-REFERENCE TO THE RELATED APPLICATIONS

This application is the continuation application of International Application No. PCT/CN2021/122804, filed on Oct. 9, 2021, which is based upon and claims priority to Chinese Patent Application No. 202110416172.7, filed on Apr. 19, 2021, the entire contents of which are incorporated herein by reference.

TECHNICAL FIELD

The present invention belongs to the technical field of path planning, and particularly relates to a vehicle lane changing trajectory planning method, an apparatus, a device, a storage medium, and a vehicle.

BACKGROUND

In recent years, with the advancement of vehicle intelligence, the exploration of an unmanned driving technology has required more engineering. The detailed technology of each part of unmanned driving has been further improved, and there are many methods for vehicle perception, planning and control to solve the problem of making unmanned driving more like human. The unavoidable lane changing during vehicle running has also become a research hotspot, and automatic lane changing of vehicles has also become one of the functions carried on some mass-produced vehicles.

At present, many methods have been developed for unmanned vehicles for use in vehicle lane changing conditions, such as a constant velocity offset lane changing trajectory method, an arc lane changing trajectory method, a trapezoidal speed lane changing trajectory method and a sine function lane changing trajectory method. However, lane changing trajectories obtained by these methods have their own advantages and disadvantages, which cannot meet the needs of users.

It can be seen that a new vehicle lane changing trajectory planning method needs to be provided to solve the technical problem that the lane changing trajectories obtained by the prior art cannot meet the general needs of the users.

SUMMARY

An objective of the embodiments of the present invention is to provide a vehicle lane changing trajectory planning method, an apparatus, a device, a storage medium, and a vehicle, aiming to solve the technical problem that lane changing trajectories obtained in the prior art cannot meet the general needs of users.

The embodiments of the present invention are realized in this way. The vehicle lane changing trajectory planning method includes:
   determining a starting point and an end point of a to-be-planned path on a grid lane changing map, which is a gridded local map reflecting a lane changing condition and takes a road boundary as a map boundary;
   performing weight allocation on all grids in the grid lane changing map by using a potential function;
   searching for optimal solutions corresponding to different weight requirements between the starting point and the end point;
   smoothing the optimal solutions corresponding to the different weight requirements to obtain lane changing trajectories corresponding to the different weight requirements; and
   selecting an optimal lane changing trajectory from the lane changing trajectories corresponding to the different weight requirements.

Another objective of the embodiments of the present invention is to provide a vehicle lane changing trajectory planning apparatus, including:
   a starting point and end point determining module, configured to determine a starting point and an end point of a to-be-planned path on a grid lane changing map, which is a gridded local map reflecting a lane changing condition and takes a road boundary as a map boundary;
   a weight allocating module, configured to perform weight allocation on all grids in the grid lane changing map by using a potential function;
   a searching module, configured to search for optimal solutions corresponding to different weight requirements between the starting point and the end point;
   a smoothing module, configured to smooth the optimal solutions corresponding to the different weight requirements to obtain lane changing trajectories corresponding to the different weight requirements; and
   a selecting module, configured to select an optimal lane changing trajectory from the lane changing trajectories corresponding to the different weight requirements.

Another objective of the embodiments of the present invention is to provide a vehicle lane changing trajectory planning device, including a memory and a processor, a computer program is stored in the memory, and when the computer program is executed by the processor, the processor is made to execute steps of the above vehicle lane changing trajectory planning method.

Another objective of the embodiments of the present invention is to provide a computer-readable storage medium, a computer program is stored on the computer-readable storage medium, and when the computer program is executed by a processor, the processor is made to execute steps of the above vehicle lane changing trajectory planning method.

Another objective of the embodiments of the present invention is to provide a vehicle with the above vehicle lane changing trajectory planning device.

The vehicle lane changing trajectory planning method provided by the embodiment of the present invention uses the potential function to perform weight allocation on all the grids in the grid lane changing map, and then searches for optical solution paths corresponding to the different weight requirements between the starting point and the end point, and finally selects the optimal lane changing trajectory from the lane changing trajectories corresponding to the different weight requirements as a final vehicle lane changing trajectory. Compared with the prior art, the corresponding optimal paths can be searched for the different requirements, and finally one of the final paths corresponding to the different requirements is selected, so that the needs of the users are met to a greater extent.

DETAILED DESCRIPTION OF THE EMBODIMENTS

In order to make objectives, technical solutions and advantages of the present invention clearer, the present invention will be described in further detail below with reference to the accompanying drawings and embodiments. It should be understood that the specific embodiments described herein are only used to explain the present invention, but not to limit the present invention.

It can be understood that the terms "first", "second", etc. used in the present application may be used herein to describe various elements, but these elements are not limited by these terms unless otherwise specified. These terms are only used to distinguish a first element from another element. For example, a first xx script may be referred to as a second xx script, and similarly, the second xx script may be referred to as the first xx script without departing from the scope of the present application.

Figure 1:
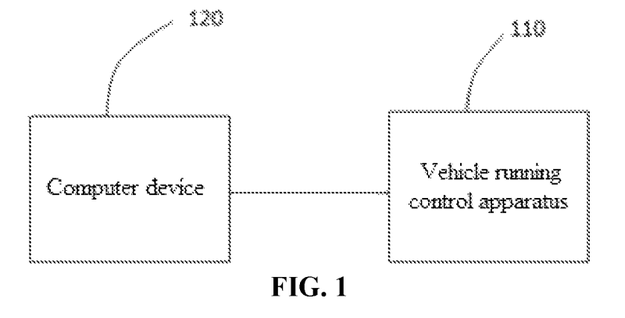
FIG. 1 is an application environment diagram of a vehicle lane changing trajectory planning method provided by an embodiment of the present invention.

As shown in FIG. 1, FIG. 1 is an application environment diagram of a vehicle lane changing trajectory planning method provided by an embodiment of the present invention. As shown in FIG. 1, an application environment includes a vehicle running control apparatus 110 and a computer device 120.

The computer device 120 may be an in-vehicle terminal, a computer, a navigation device, etc., but is not limited to this. The computer device 120 is configured to execute a vehicle lane changing trajectory planning method and output a lane changing trajectory.

The vehicle running control apparatus 110 is configured to control a vehicle to run according to the lane change trajectory output by the computer device 120. The vehicle running control apparatus 110 and the computer device 120 may be connected through a network, which is not limited in the present invention.

Figure 2:
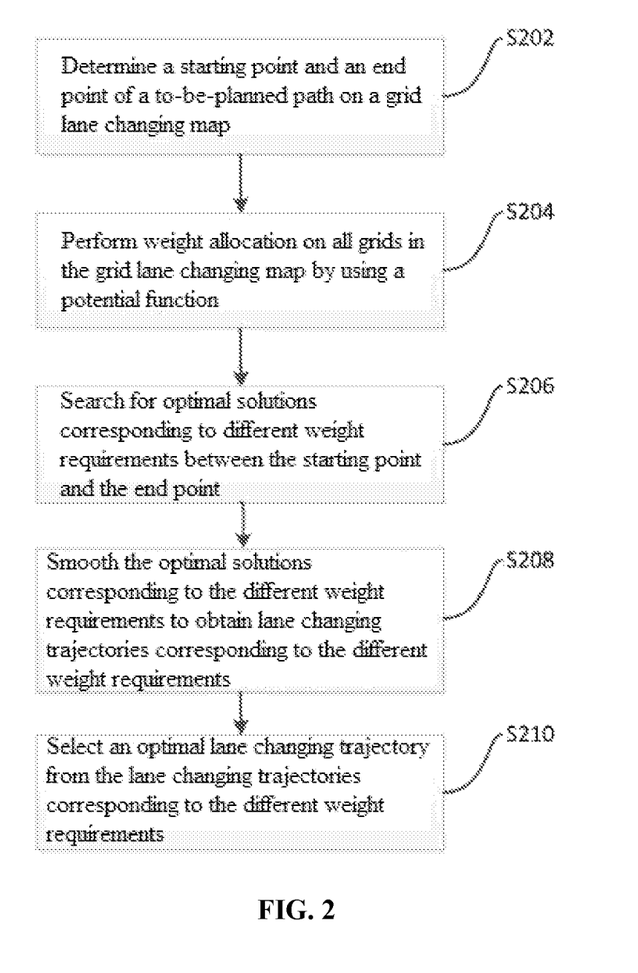
FIG. 2 is a flowchart of a vehicle lane changing trajectory planning method provided by an embodiment of the present invention.

As shown in FIG. 2, in an embodiment of the present invention, a vehicle lane changing trajectory planning method is provided. This embodiment is mainly illustrated by applying the method to the computer device 120 in FIG. 1 above.

The vehicle lane changing trajectory planning method may specifically include the following steps:

Step S202, a starting point and an end point of a to-be-planned path on a grid lane changing map are determined, and the grid lane changing map is a gridded local map reflecting a lane changing condition and takes a road boundary as a map boundary.

Figure 3:
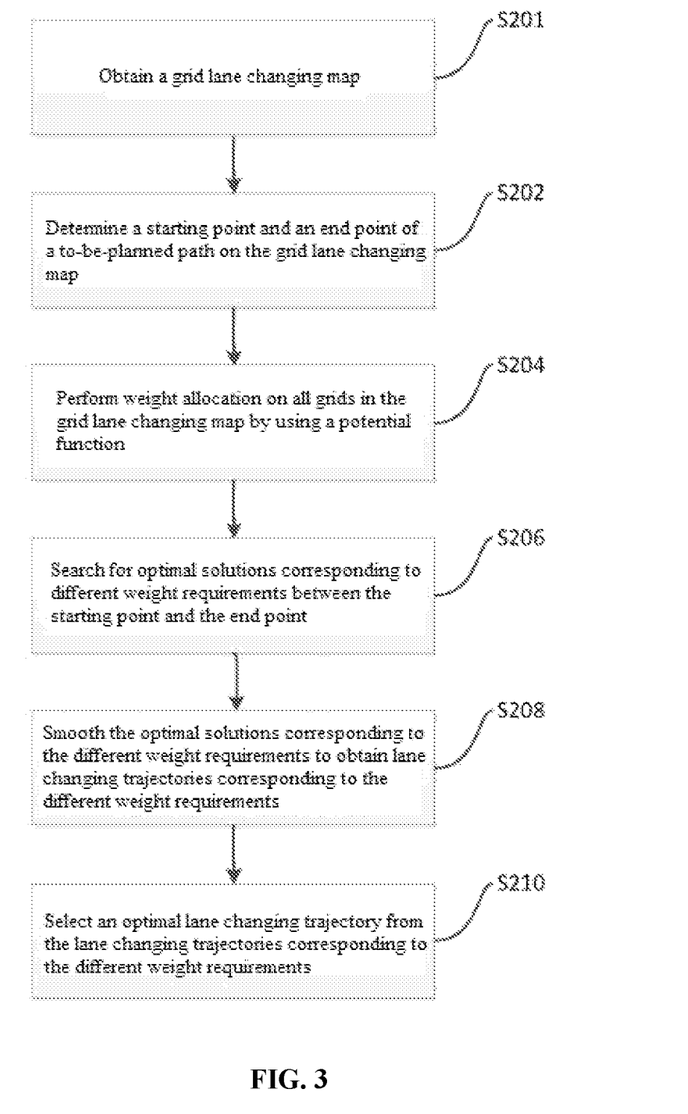
FIG. 3 is a flowchart of a vehicle lane changing trajectory planning method including a step of obtaining a grid lane changing map provided by an embodiment of the present invention.

In the embodiment of the present invention, as shown in FIG. 3, before step S202, the method further includes:

step S201, the grid lane changing map is obtained.

The embodiment does not limit the specific mode of obtaining the grid lane changing map. For example, the grid lane changing map may be directly obtained from other devices than the device to which the vehicle lane changing trajectory planning method is applied, or a lane changing map may be obtained first through an image acquisition device and refers to a local map that may reflect the lane changing condition of a vehicle to be subjected to lane changing, and then the lane changing map is gridded by using a grid division state function, and a lane boundary is used as a map edge during gridding, so that the grid lane change map is obtained. The grid division state function may be:

$$\begin{cases} W = \dfrac{1000}{\mu a + v} \\ L = (a + \eta v)1000 \end{cases},$$

where, W is the quantity of grids distributed on an x-coordinate in a single-lane frenet coordinate system; μ is an accelerated speed correction coefficient of the vehicle to be subjected to lane changing; a is an accelerated speed of the vehicle to be subjected to lane changing; v is a speed of the vehicle to be subjected to lane changing; L is the quantity of grids distributed on a y-coordinate under the frenet coordinate system; and η is a speed correction amount of the vehicle to be subjected to lane changing under a y-coordinate grid distribution function L.

In the embodiment of the present invention, the starting point of the to-be-planned path on the grid lane changing map is a center point of the vehicle to be subjected to lane changing. For the end point of the to-be-planned path on the grid lane change map, a plurality of points are randomly spread on a center line of a target lane as end point coordinates. Due to different lane change paths, the position of the lane to be subjected to lane changing to the center line of the target lane may not be fixed, and the end point of the vehicle to be subjected to lane changing is on the center line of the target lane. The embodiment does not limit the specific way of determining the end point of the vehicle to be subjected to lane changing. For example, the determination of the end point may be realized by the following formula:

$$\begin{cases} y + 3r_{min} \le \text{Range} \le y + 5r_{min} \\ P(i) = y + 3r_{min} + \left(\dfrac{2r_{min}a}{5}\right)i \end{cases},$$

where Range is a spread point range, y is a road direction coordinate of the vehicle to be subjected to lane changing, $r_{min}$ is a minimum turning radius of the vehicle, P(i) is a position of a spread point, a is an accelerated speed of the vehicle to be subjected to lane changing, and i is a serial number of the spread point. The embodiment does not limit the specific quantity of the spread points, for example, it may be i=1-5.

Step S204, weight allocation is performed on all grids in the grid lane changing map by using a potential function.

In the embodiment of the present invention, the potential function may include a first constraint, a second constraint, a third constraint and a fourth constraint, and the first constraint is a distance between the grids in the grid lane changing map and an obstacle vehicle; the second constraint is a distance between the grids in the grid lane changing map and a boundary of a side of an original lane away from the target lane; the third constraint is a distance between the grids in the grid lane changing map and a boundary of a side of the target lane away from the original lane; the fourth constraint is an arc lane changing trajectory, for example, the lane change trajectory may be simulated by using a quarter-circle method; the potential function may specifically be:

$$\delta = \delta_1 + \delta_2 + \delta_3 + \delta_4;$$

$$\delta_1 = \xi_1[\|x_i - x_{ob}\| + |y_i - y_{ob}|];$$

$$\delta_2 = \xi_2 |x_b - x_i|;$$

$$\delta_3 = \xi_3 |x_a - x_i|;$$

where, $\delta_1$ is a weight of the first constraint in the potential function, $\xi_1$, $\xi_2$, and $\xi_3$ are Manhattan distance correction coefficients, $(x_i, y_i)$ is a coordinate of a grid to be calculated, $(x_{ob}, y_{ob})$ is a center coordinate of the obstacle vehicle, $\delta_2$ is a weight of the second constraint in the potential function, $x_b$ is an x-axis coordinate of the boundary of the side of the lane away from the target lane, $\delta_3$ is a weight of the third constraint in the potential function, $x_a$ is an x-axis coordinate of the boundary of the side of the target lane away from the original lane, and $\delta_4$ is a weight of the fourth constraint in the potential function.

Step S206, optimal solutions corresponding to different weight requirements between the starting point and the end point are searched for.

In the embodiment of the present invention, a plurality of paths may be implemented from the start point to the end point, and each path has its own advantages and disadvantages. For example, users may have different performance requirements for comfort, time, energy saving, etc. Weights corresponding to the paths under different performance requirements are also different, and the optimal solutions corresponding to the different weight requirements refer to the optimal paths corresponding to the different performance requirements. For example, the comfort requirement corresponds to an optimal solution, the time requirement corresponds to an optimal solution, and the energy saving requirement corresponds to an optimal solution.

In the embodiment of the present invention, the specific method of searching for the optimal solutions corresponding to the different weight requirements between the starting point and the end point is not limited. For example, an A* algorithm is used to search for the optimal solutions corresponding to the different weight requirements between the starting point and the end point. The embodiment uses the A* algorithm to search for the optimal solutions corresponding to the different weight requirements between the starting point and the end point as an example to illustrate, and potential functions corresponding to the different weight requirements need to be obtained first:

$$\delta = (\delta_1, \ \delta_2, \ \delta_3, \ \delta_4) \begin{pmatrix} \lambda_1 \\ \lambda_2 \\ \lambda_3 \\ \tau\lambda_4 \end{pmatrix},$$

where, $\lambda_1$ is an allocation constant of the first constraint, $\lambda_2$ is an allocation constant of the second constraint, $\lambda_3$ is an allocation constant of the third constraint, $\lambda_4$ is an allocation constant of the fourth constraint, and $\tau$ is a weight control coefficient of the fourth constraint. Therefore, the potential functions corresponding to the $\tau$ weight requirements, or $\tau$ initial potential field maps may be obtained and input into the A* algorithm, the A* algorithm may obtain $\tau*i$ paths according to a potential field search path of each cell formed by the potential functions corresponding to the different weight requirements, and the optimal solutions of the corresponding paths under the different weight requirements are obtained by searching.

Step S208, smoothing is performed on the optimal solutions corresponding to the different weight requirements to obtain lane changing trajectories corresponding to the different weight requirements.

In the embodiment of the present invention, the specific method for smoothing the optimal solutions corresponding to the different weight requirements is not limited, and sharper corners in the lane changing paths may be effectively removed by smoothing the optimal solution paths corresponding to the different weight requirements. For example, for the optimal solutions of the corresponding paths under the different weight requirements, a D-P algorithm may be used to remove the noise in the paths first, and then a b-spline is used to smooth the optimal solutions corresponding to the different weight requirements.

Step S210, an optimal lane changing trajectory is selected from the lane changing trajectories corresponding to the different weight requirements.

In the embodiment of the present invention, the different weight requirements correspond to different optimal paths, but users can change from the original lane to the target lane using any of the different optimal paths but must only select an optimal lane change trajectory as a final lane change trajectory. The embodiment does not limit the specific method of selecting the optimal lane changing trajectory from the lane changing trajectories corresponding to the different weight requirements. For example, a cost function may be defined, and the cost function may be used to evaluate the cost of each lane changing trajectory, and finally, the lane changing trajectory with the lowest cost is selected as the optimal lane changing trajectory. For example, the cost function may consist of dynamic constraints, whether to deviate from a road center, and whether a curvature and a lateral accelerated speed are below threshold values, but not limited thereto.

The vehicle lane changing trajectory planning method provided by the embodiment of the present invention uses the potential function to perform weight allocation on all the grids in the grid lane changing map, and then searches for the optical solution paths corresponding to the different weight requirements between the starting point and the end point, and finally selects the optimal lane changing trajectory from the lane changing trajectories corresponding to the different weight requirements as the final vehicle lane changing trajectory. Compared with the prior art, the corresponding optimal paths can be searched for the different requirements, and finally one of the final paths corresponding to the different requirements is selected, so that the needs of the users are met to a greater extent.

Figure 4:
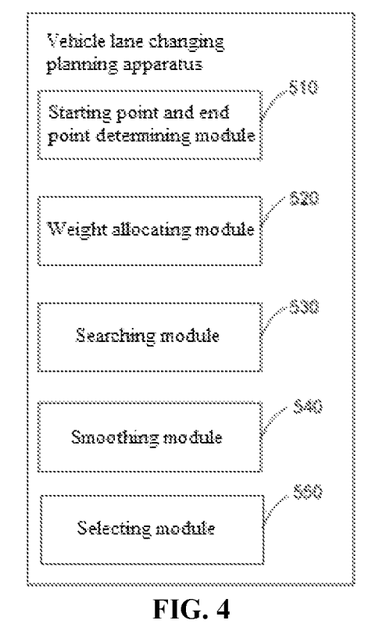
FIG. 4 is a structural block diagram of a vehicle lane change planning apparatus provided by an embodiment of the present invention.

As shown in FIG. 4, in one embodiment, a vehicle lane changing trajectory planning apparatus is provided, may be integrated into the above computer device 120, and specifically may include a starting point and end point determining module 510, a weight allocating module 520, a searching module 530, a smoothing module 540, and a selecting module 550.

The starting point and end point determining module 510 is configured to determine a starting point and an end point of a to-be-planned path on a grid lane changing map, which is a gridded local map reflecting a lane changing condition and takes a road boundary as a map boundary.

The weight allocating module 520 is configured to perform weight allocation on all grids in the grid lane changing map by using a potential function.

The searching module 530 is configured to search for optimal solutions corresponding to different weight requirements between the starting point and the end point.

The smoothing module 540 is configured to smooth the optimal solutions corresponding to the different weight requirements to obtain lane changing trajectories corresponding to the different weight requirements.

The selecting module 550 is configured to select an optimal lane changing trajectory from the lane changing trajectories corresponding to the different weight requirements.

In the vehicle lane changing trajectory planning method provided by the embodiment of the present invention, the functions of the starting point and end point determining module 510, the weight allocating module 520, the searching module 530, the smoothing module 540, and the selecting module 550 are implemented and correspond to the steps S202, S204, S206, S208, and S210 in the vehicle lane changing trajectory planning method described above. For the specific explanations in the vehicle lane changing trajectory planning method and the content of related refinement and optimization, please refer to the specific embodiment of the above vehicle lane changing trajectory planning method, which will not be repeated here.

Figure 5:
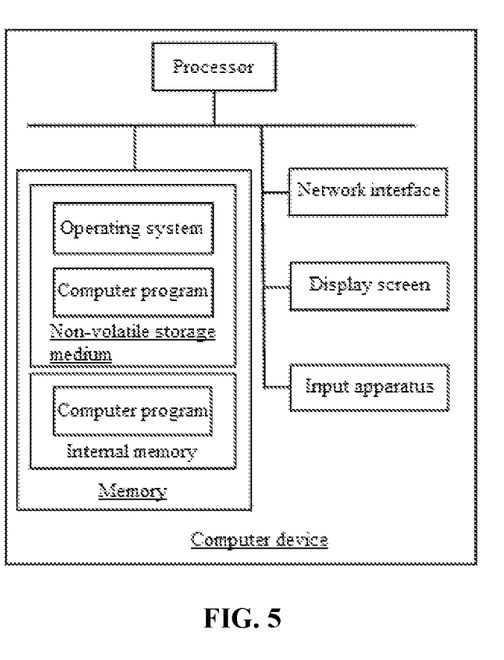
FIG. 5 is a block diagram of an internal structure of a computer device in one embodiment.

FIG. 5 shows a diagram of an internal structure of a computer device in one embodiment. The computer device may specifically be the computer device 120 in FIG. 1. As shown in FIG. 5, the computer device includes a processor, a memory, a network interface, an input apparatus and a display screen which are connected by a system bus. The memory includes a non-volatile storage medium and an internal memory. The non-volatile storage medium of the computer device stores an operating system, and may also store a computer program. When the computer program is executed by the processor, the processor may implement the vehicle lane changing trajectory planning method. A computer program may also be stored in the internal memory, and when the computer program is executed by the processor, the processor may execute the vehicle lane changing trajectory planning method. The display screen of the computer device may be a liquid crystal display screen or an electronic ink display screen, and the input apparatus of the computer device may be a touch layer covering the display screen, or a button, a trackball or a touchpad disposed on a shell of the computer device, or an external keyboard, a touchpad or a mouse, etc.

Those skilled in the art can understand that the structure shown in FIG. 5 is only a block diagram of a partial structure related to the solution of the present application, and does not constitute a limitation to the computer device to which the solution of the present application is applied. The specific computer device may include more or fewer components than those shown in the figure, or combine certain components, or have a different arrangement of components.

In one embodiment, the vehicle lane changing trajectory planning apparatus provided by the present application may be implemented in a form of the computer program, and the computer program may be executed on the computer device as shown in FIG. 5. The memory of the computer device may store various program modules that make up the vehicle lane changing trajectory planning apparatus, for example, the starting point and end point determining module 510, the weight allocating module 520, the searching module 530, the smoothing module 540, and the selecting module 550 shown in FIG. 4. The computer program implemented by each program module enables the processor to execute the steps in the vehicle lane changing trajectory planning method of each embodiment of the present application described in the specification.

For example, the computer device shown in FIG. 5 may execute step S202 through the starting point and end point determining module 510 in the vehicle lane changing trajectory planning apparatus shown in FIG. 4. The computer device may execute step S204 through the weight allocating module 520. The computer device may execute step S206 through the searching module 530. The computer device may execute step S208 through the smoothing module 540. The computer device may execute step S210 through the selecting module 550.

In one embodiment, a vehicle lane changing trajectory planning device is provided and includes a memory, a processor, and a computer program stored on the memory and executable on the processor. The processor implements the following steps when executing the computer program:

step S202, a starting point and an end point of a to-be-planned path on a grid lane changing map are determined, and the grid lane changing map is a gridded local map reflecting a lane changing condition and takes a road boundary as a map boundary;

step S204, weight allocation is performed on all grids in the grid lane changing map by using a potential function;

step S206, optimal solutions corresponding to different weight requirements between the starting point and the end point are searched for;

step S208, smoothing is performed on the optimal solutions corresponding to the different weight requirements to obtain lane changing trajectories corresponding to the different weight requirements; and step S210, an optimal lane changing trajectory is selected from the lane changing trajectories corresponding to the different weight requirements.

In one embodiment, a computer-readable storage medium is provided, and a computer program is stored on the computer-readable storage medium. When the computer program is executed by the processor, the processor is made to execute the following steps: step S202, a starting point and an end point of a to-be-planned path on a grid lane changing map are determined, and the grid lane changing map is a gridded local map reflecting a lane changing condition and takes a road boundary as a map boundary;

step S204, weight allocation is performed on all grids in the grid lane changing map by using a potential function;

step S206, optimal solutions corresponding to different weight requirements between the starting point and the end point are searched for;

step S208, smoothing is performed on the optimal solutions corresponding to the different weight requirements to obtain lane changing trajectories corresponding to the different weight requirements; and step S210, an optimal lane changing trajectory is selected from the lane changing trajectories corresponding to the different weight requirements.

In an embodiment of the present invention, a vehicle is also provided, and the vehicle includes the above vehicle lane changing trajectory planning device.

In the embodiment of the present invention, the vehicle lane changing trajectory planning device is configured to plan a lane changing path for the vehicle, and output the optimal lane changing trajectory. The vehicle also includes a control apparatus, which is connected to the vehicle lane changing trajectory planning device and configured to control the vehicle to run according to the optimal lane changing trajectory.

It should be understood that although the steps in flowcharts of the embodiments of the present invention are sequentially displayed according to the arrows, these steps are not necessarily executed in the order indicated by the arrows. Unless explicitly stated herein, there is no strict order in the execution of these steps, and these steps may be performed in other orders. Moreover, at least a part of the steps in each embodiment may include a plurality of sub-steps or a plurality of stages. These sub-steps or stages are not necessarily executed and completed at the same time, but may be executed at different times. The sub-steps or the stages are also not necessarily sequentially performed, but may be performed alternately or alternately with other steps or at least a part of sub-steps or stages of other steps.

Those ordinarily skilled in the art can understand that all or part of the process in the method of the above embodiments may be implemented by instructing relevant hardware through the computer program. The program may be stored in the non-volatile computer-readable storage medium. When the program is executed, it may include the processes of the above method embodiments. Any reference to the memory, storage, a database or other media used in the various embodiments provided in the present application may include a non-volatile and/or volatile memory. The non-volatile memory may include a read only memory (ROM), a programmable ROM (PROM), an electrically programmable ROM (EPROM), an electrically erasable programmable ROM (EEPROM), or a flash memory. The volatile memory may include a random access memory (RANI) or an external cache memory. By way of illustration and not limitation, the RANI is available in various forms such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a memory bus (Rambus) direct RAM (RDRAM), a direct memory bus dynamic RAM (DRDRAM), and a memory bus dynamic RAM (RDRAM).

The technical features of the above embodiments can be combined arbitrarily. For the sake of brevity, all possible combinations of the technical features in the above embodiments are not described. However, as long as the combinations of these technical features do not have contradiction, it should be regarded as the scope of the description in this specification.

The above embodiments only express several implementations of the present invention, and its description is more specific and detailed, but it should not be construed as a limitation to the scope of the patent of the present invention. It should be pointed out that for those ordinarily skilled in the art, without departing from the concept of the present invention, several modifications and improvements can be made, which all belong to the protection scope of the present invention. Therefore, the protection scope of the patent of the present invention should be subject to the appended claims.

The above are only preferred embodiments of the present invention, and are not intended to limit the present invention. Any modifications, equivalent replacements and improvements made within the spirit and principles of the present invention should be included within the scope of protection of the present invention.

What is claimed is:

1. A vehicle lane changing trajectory planning method, comprising:
performing operations, by a computer device, comprising:
1) Determining a starting point and an end point of a to-be-planned path on a grid lane changing map, wherein the grid lane changing map is a gridded local map reflecting a lane changing condition and wherein the gridded local map uses a road boundary as a map boundary, wherein step 1 comprises:
randomly spreading a plurality of points on a center line of a target lane as end point coordinates, $$\begin{cases} y + 3r_{min} \le \text{Range} \le y + 5r_{min} \\ P(i) = y + 3r_{min} + \left(\dfrac{2r_{min}a}{5}\right)i \end{cases}$$

wherein Range is a spread point range, y is a road direction coordinate of a vehicle to be subjected to lane changing, $r_{min}$ is a minimum turning radius of the vehicle, P(i) is a position of a spread point, a is an accelerated speed of the vehicle to be subjected to lane changing, and i is a serial number of the spread point;
2) performing weight allocation on all grids in the grid lane changing map by using a potential function;
3) searching for optimal solutions corresponding to different weight requirements between the starting point and the end point by using an A* algorithm;
4) smoothing the optimal solutions corresponding to the different weight requirements to obtain lane changing trajectories corresponding to the different weight requirements; and
5) selecting an optimal lane changing trajectory from the lane changing trajectories corresponding to the different weight requirements; and
controlling the vehicle to movement in response to the selected optimal lane changing trajectory.

2. The vehicle lane changing trajectory planning method according to claim 1, wherein the potential function comprises a first constraint, a second constraint, a third constraint and a fourth constraint, the first constraint is a distance between the grids in the grid lane changing map and an obstacle vehicle, the second constraint is a distance between the grids in the grid lane changing map and a boundary of a side of an original lane away from a target lane, the third constraint is a distance between the grids in the grid lane changing map and a boundary of a side of the target lane away from the original lane, and the fourth constraint is an arc lane changing trajectory; and
the potential function is:

$$\delta = \delta_1 + \delta_2 + \delta_3 + \delta_4;$$

$$\delta_1 = \xi_1[\|x_i - x_{ob}\| + \|y_i - y_{ob}\|];$$

$$\delta_2 = \xi_2 |x_b - x_i|;$$

$$\delta_3 = \xi_3 |x_a - x_i|;$$

wherein 81 is a weight of the first constraint in the potential function, $\xi_1$, $\xi_2$, and $\xi_3$ are Manhattan distance correction coefficients, $(x_i, y_i)$ is a coordinate of a grid to be calculated, $(x_{ob}, y_{ob})$ is a center coordinate of the obstacle vehicle, $\delta_2$ is a weight of the second constraint in the potential function, $x_b$ is an x-axis coordinate of the boundary of the side of the lane away from the target lane, $\delta_3$ is a weight of the third constraint in the potential function, $x_a$ is an x-axis coordinate of the boundary of the side of the target lane away from the original lane, and $\delta_4$ is a weight of the fourth constraint in the potential function.

3. The vehicle lane changing trajectory planning method according to claim 2, wherein step 3 comprises:

obtaining potential functions corresponding to the different weight requirements:

$$\delta = (\delta_1, \ \delta_2, \ \delta_3, \ \delta_4) \begin{pmatrix} \lambda_1 \\ \lambda_2 \\ \lambda_3 \\ \tau\lambda_4 \end{pmatrix},$$

wherein $\lambda_1$ is an allocation constant of the first constraint, $\lambda_2$ is an allocation constant of the second constraint, $\lambda_3$ is an allocation constant of the third constraint, $\lambda_4$ is an allocation constant of the fourth constraint, and $\tau$ is a weight control coefficient of the fourth constraint; and determining, by the A* algorithm, the optimal solutions corresponding to the different weight requirements between the starting point and the end point according to the weights of the constraints in the potential functions corresponding to the different weight requirements.

4. The vehicle lane changing trajectory planning method according to claim 1, wherein in step 5, a cost function is used to select the optimal lane changing trajectory from the lane changing trajectories corresponding to the different weight requirements.

5. The vehicle lane changing trajectory planning method according to claim 1, further comprising obtaining the grid lane changing map, wherein obtaining the grid lane changing map comprises:
 obtaining a lane changing map; and
 gridding the lane changing map by using a grid division state function to obtain the grid lane changing map;
 wherein the grid division state function is:

$$\begin{cases} W = \dfrac{1000}{\mu a + v} \\ L = (a + \eta v)1000 \end{cases},$$

wherein W is a quantity of grids distributed on an x-coordinate in a single-lane frenet coordinate system; μ is an accelerated speed correction coefficient of the vehicle to be subjected to lane changing; a is an accelerated speed of the vehicle to be subjected to lane changing; v is a speed of the vehicle to be subjected to lane changing; L is a quantity of grids distributed on a y-coordinate under the single-lane frenet coordinate system; and η is a speed correction amount of the vehicle to be subjected to lane changing under a y-coordinate grid distribution function L.

6. The vehicle lane changing trajectory planning method according to claim 1, wherein the controlling the vehicle to run, based on the optimal lane changing trajectory comprises:

receiving by a vehicle running control apparatus from the computer device, the optimal lane changing trajectory; and controlling, by the vehicle running control apparatus, the vehicle to run, based on the optimal lane changing trajectory.

7. A vehicle lane changing trajectory planning apparatus, comprising:

a computer device being configured to perform operations, comprising:

1) determining a starting point and an end point of a to-be-planned path on a grid lane changing map, wherein the grid lane changing map is a gridded local map reflecting a lane changing condition, and wherein the gridded local map uses a road boundary as a map boundary; wherein step 1 comprises:

randomly spreading a plurality of points on a center line of a target lane as end point coordinates, $$\begin{cases} y + 3r_{min} \leq \text{Range} \leq y + 5r_{min} \\ P(i) = y + 3r_{min} + \left(\dfrac{2r_{min}a}{5}\right)i \end{cases}$$

wherein Range is a spread point range, y is a road direction coordinate of a vehicle to be subjected to lane changing, $r_{min}$ is a minimum turning radius of the vehicle, P(i) is a position of a spread point, a is an accelerated speed of the vehicle to be subjected to lane changing, and i is a serial number of the spread point;

2) performing weight allocation on all grids in the grid lane changing map by using a potential function;

3) searching for optimal solutions corresponding to different weight requirements between the starting point and the end point by using an A* algorithm;

4) smoothing the optimal solutions corresponding to the different weight requirements to obtain lane changing trajectories corresponding to the different weight requirements; and 5) selecting an optimal lane changing trajectory from the lane changing trajectories corresponding to the different weight requirements, wherein the vehicle is controlled to run based on the selected optimal lane changing trajectory.

8. A vehicle comprising the vehicle lane changing trajectory planning apparatus according to claim 7.

* * * * *